US012525197B2

(12) United States Patent
Park et al.

(10) Patent No.: US 12,525,197 B2
(45) Date of Patent: Jan. 13, 2026

(54) DISPLAY DEVICE AND LEVEL SHIFTER

(71) Applicant: LG Display Co., Ltd., Seoul (KR)

(72) Inventors: JunHwan Park, Paju-si (KR); Sang-Uk Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 37 days.

(21) Appl. No.: 18/800,578

(22) Filed: Aug. 12, 2024

(65) Prior Publication Data

US 2025/0182700 A1 Jun. 5, 2025

(30) Foreign Application Priority Data

Nov. 30, 2023 (KR) ........................ 10-2023-0170308

(51) Int. Cl.
*G09G 3/3266* (2016.01)
*G09G 3/3233* (2016.01)
*G09G 3/36* (2006.01)

(52) U.S. Cl.
CPC ......... *G09G 3/3266* (2013.01); *G09G 3/3233* (2013.01); *G09G 3/3677* (2013.01); *G09G 2300/0842* (2013.01); *G09G 2310/0289* (2013.01); *G09G 2310/0291* (2013.01); *G09G 2310/08* (2013.01); *G09G 2330/021* (2013.01); *G09G 2380/10* (2013.01)

(58) Field of Classification Search
CPC .. G09G 3/3266; G09G 3/3233; G09G 3/3677; G09G 2300/0842; G09G 2310/0289; G09G 2310/0291; G09G 2310/08; G09G 2330/021; G09G 2380/10; G09G 2354/00
See application file for complete search history.

(56) References Cited

U.S. PATENT DOCUMENTS

| | | | | |
|---|---|---|---|---|
| 6,861,635 B1 * | 3/2005 | Phan | H10F 39/186 257/E27.139 |
| 9,741,400 B2 * | 8/2017 | Nagatsuka | G11C 8/14 |
| 12,272,306 B2 * | 4/2025 | Wen | G09G 3/3233 |
| 2005/0206441 A1 * | 9/2005 | Kimura | G11C 5/145 327/536 |
| 2006/0109232 A1 * | 5/2006 | Kuo | G09G 3/3674 345/100 |
| 2008/0309597 A1 * | 12/2008 | Nam | G09G 3/3696 345/87 |
| 2010/0045838 A1 * | 2/2010 | Okano | H02M 3/07 348/308 |
| 2010/0111245 A1 * | 5/2010 | Tobita | G11C 19/184 377/64 |
| 2010/0201666 A1 * | 8/2010 | Tobita | G09G 3/3677 377/79 |
| 2017/0110081 A1 * | 4/2017 | Han | G09G 3/3677 |
| 2018/0137808 A1 * | 5/2018 | Na | G09G 3/3233 |
| 2018/0204520 A1 * | 7/2018 | Kobayashi | G09G 3/3233 |
| 2020/0098297 A1 * | 3/2020 | Heo | G09G 3/20 |

(Continued)

*Primary Examiner* — Christopher E Leiby
(74) *Attorney, Agent, or Firm* — Fenwick & West LLP

(57) ABSTRACT

A level shifter or a display device comprising a level shifter includes a scan channel circuit generating a scan start signal for a plurality of subpixels according to a first input signal, a charge pump circuit generating a high-potential emission voltage using circuit power of a host system, and an emission channel circuit controlling an emission start signal according to a second input signal with a change in the circuit power reflected.

20 Claims, 11 Drawing Sheets

(56) References Cited

U.S. PATENT DOCUMENTS

| | | | | |
|---|---|---|---|---|
| 2020/0386711 | A1 * | 12/2020 | Fife | G01R 29/26 |
| 2021/0118374 | A1 * | 4/2021 | Jeong | G09G 3/2092 |
| 2025/0054432 | A1 * | 2/2025 | Matsuzaki | H10D 86/60 |
| 2025/0218380 | A1 * | 7/2025 | Wen | G09G 3/3233 |

* cited by examiner

DISPLAY DEVICE AND LEVEL SHIFTER

CROSS-REFERENCE TO RELATED APPLICATION

This application claims priority to Republic of Korea Patent Application No. 10-2023-0170308, filed on Nov. 30, 2023, which is hereby incorporated by reference in its entirety.

BACKGROUND

Technical Field

Embodiments of the disclosure relate to a display device and a level shifter and, more specifically, to a display device and a level shifter capable of preventing or at least reducing an accident due to an error in the display panel.

Description of Related Art

The growth of the intelligent society leads to increased demand for image display devices and use of various types of display devices, such as liquid crystal displays, organic light emitting displays, etc.

Among these display devices, the organic light emitting display device uses self-emissive organic light emitting diodes, providing advantages, such as a fast response and better contrast ratio, luminous efficiency, luminance, and viewing angle.

The display device may include emission elements respectively arranged in a plurality of subpixels disposed on a display panel and cause the light emitting diodes to emit light by controlling the voltage applied to the emission elements, thereby displaying images while controlling the brightness of each subpixel.

Recently, the area of use of display devices is gradually expanding, including not only portable computers but also desktop computer monitors, vehicle displays, and wall-mounted televisions.

Such a display device may provide various functions depending on the purpose of the electronic device on which the display panel is mounted. For example, for vehicle display devices, the navigation function may be said to be an essential function.

Meanwhile, the display device may turn off abnormally due to shock or overcurrent during the driving process. In this case, if the screen flickers or display errors, such as horizontal stripes, occur during the abnormal turn-off process of a display device, such as a navigation device, there is a possibility that an accident may occur due to the driver's sudden reaction.

SUMMARY

Accordingly, the inventors of the disclosure have invented a display device and a level shifter that may prevent or at least reduce accidents due to display errors when the display panel is abnormally turned off.

Embodiments of the disclosure may provide a display device and a level shifter that may eliminate display errors by blocking an emission control transistor that controls the emission element when the display panel is abnormally turned off.

Embodiments of the disclosure may provide a display device and a level shifter that may prevent or at least reduce accidents due to display errors by controlling the emission signal applied to the subpixel to turn off when the display panel is abnormally turned off.

Embodiments of the disclosure may provide a display device, comprising a display panel including a plurality of subpixels, a gate driving circuit supplying a scan signal and an emission signal to the display panel through a plurality of gate lines, a level shifter controlling the gate driving circuit, and a timing controller controlling the level shifter, wherein the level shifter includes a scan channel circuit generating a scan start signal for the plurality of subpixels according to a first input signal, a charge pump circuit generating a high-potential emission voltage using circuit power of a host system, and an emission channel circuit controlling an emission start signal according to a second input signal with a change in the circuit power reflected.

Embodiments of the disclosure may provide a level shifter, comprising a scan channel circuit generating a scan start signal for a plurality of subpixels according to a first input signal, a charge pump circuit generating a high-potential emission voltage using circuit power of a host system, and an emission channel circuit controlling an emission start signal according to a second input signal with a change in the circuit power reflected.

According to embodiments of the disclosure, it is possible to prevent or at least reduce accidents due to display errors when the display panel is abnormally turned off.

According to embodiments of the disclosure, it is possible to eliminate display errors and reduce power consumption by blocking an emission control transistor that controls the emission element when the display panel is abnormally turned off.

According to embodiments of the disclosure, it is possible to prevent or at least reduce accidents due to display errors by controlling the emission signal applied to the subpixel to turn off when the display panel is abnormally turned off.

BRIEF DESCRIPTION OF THE DRAWINGS

The above and other objectives, features, and advantages of the disclosure will be more clearly understood from the following detailed description, taken in conjunction with the accompanying drawings.

DETAILED DESCRIPTION

Figure 1:
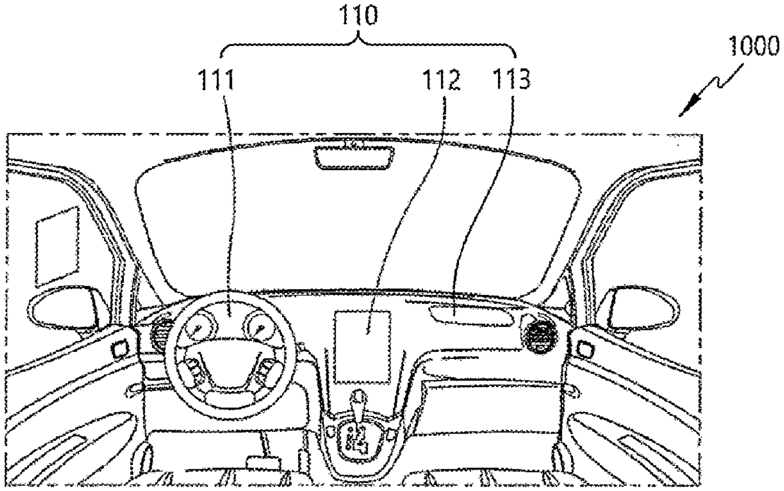
FIG. 1 is a view illustrating an example inside of a vehicle according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can”.

Hereinafter, various embodiments of the disclosure will be described in detail with reference to the accompanying drawings.

FIG. 1 is a view illustrating an example inside of a vehicle according to embodiments of the disclosure.

Referring to FIG. 1, the vehicle 1000 according to embodiments of the disclosure may include a driver seat and a passenger seat, a dashboard positioned in front of the driver seat and the passenger seat and on which various instruments necessary for driving are disposed, and a center fascia having a control plate of an electronic device.

The dashboard may include a first display panel 111 that displays information necessary for driving, including a speedometer. The first display panel 111 may be referred to as a dashboard display panel.

The first display panel 111 is a display panel capable of safely driving the vehicle 1000 by transferring information about the driving state of the vehicle 1000 and operations of various electronic devices provided in the vehicle 1000 to the driver. A speedometer positioned behind the steering wheel with respect to the driver seat to indicate the driving speed, a tripmeter indicating the driving distance, a tachometer indicating the revolutions per meter (RPM) of the engine, a fuel gauge, a water thermometer, an engine thermometer, and various warning lamps may be displayed through the first display panel 111.

The center fascia is positioned between the driver seat and the passenger seat, and may correspond to an area where the dashboard and the shift lever meet vertically, and an audio, an air conditioner, a heater controller, a navigator, a blower, a cigar jack, an ashtray, a cup holder, and the like may be disposed therein. Further, the center fascia may include a second display panel 112.

The second display panel 112 may direct a route to a destination or display a map image corresponding to a current location, and display a user interface related to control of various electronic devices installed in the vehicle 1000. Further, when the vehicle 1000 and the mobile terminal are connected, a screen provided by the mobile terminal may be displayed.

The second display panel 112 positioned between the driver seat and the passenger seat of the vehicle 1000 may be referred to as a center fascia display panel.

Further, a third display panel 113 for convenience of a passenger in the passenger seat may be additionally installed on the front surface of the passenger seat. The third display panel 113 positioned in the passenger seat may be referred to as a passenger seat display panel.

Further, the display panel 110 may further include at least one of a front window display panel, a side mirror display panel, a rear-view mirror display panel, and a side window display panel, in addition to the dashboard display panel 111, the center fascia display panel 112, and the passenger seat display panel 113. Further, various types of display panels may be installed.

The front window display panel may be a display panel that projects a virtual image to a partial area of the front window capable of viewing the front of the vehicle 1000. By displaying the speed of the vehicle, the remaining amount of fuel, the route direction information, and the like through the front window display panel, it is possible to minimize or at least reduce the driver’s unnecessary gaze changing in different directions.

The side mirror display panel may be a display panel capable of displaying an image of a side surface captured through a side camera in a partial area or an entire area of the side mirror formed to view the side surface of the vehicle 1000. Accordingly, the driver may identify not only the image of the side surface reflected through the side mirror, but also the image of the side surface captured through the side camera through the side mirror display panel.

The rear-view mirror display panel may be a display panel capable of displaying an image of the rear captured by the rear camera in a partial area or an entire area of the rear-view mirror formed to view the rear of the vehicle 1000. Accordingly, the driver may identify not only the rear image reflected through the rear-view mirror, but also the rear image captured through the rear camera through the rear-view mirror display panel.

The side window display panel may be a display panel that projects a virtual image onto a partial area of the side window capable of viewing a side surface of the vehicle 1000. Various information about the vehicle may be displayed through the side window display panel.

Figure 2:
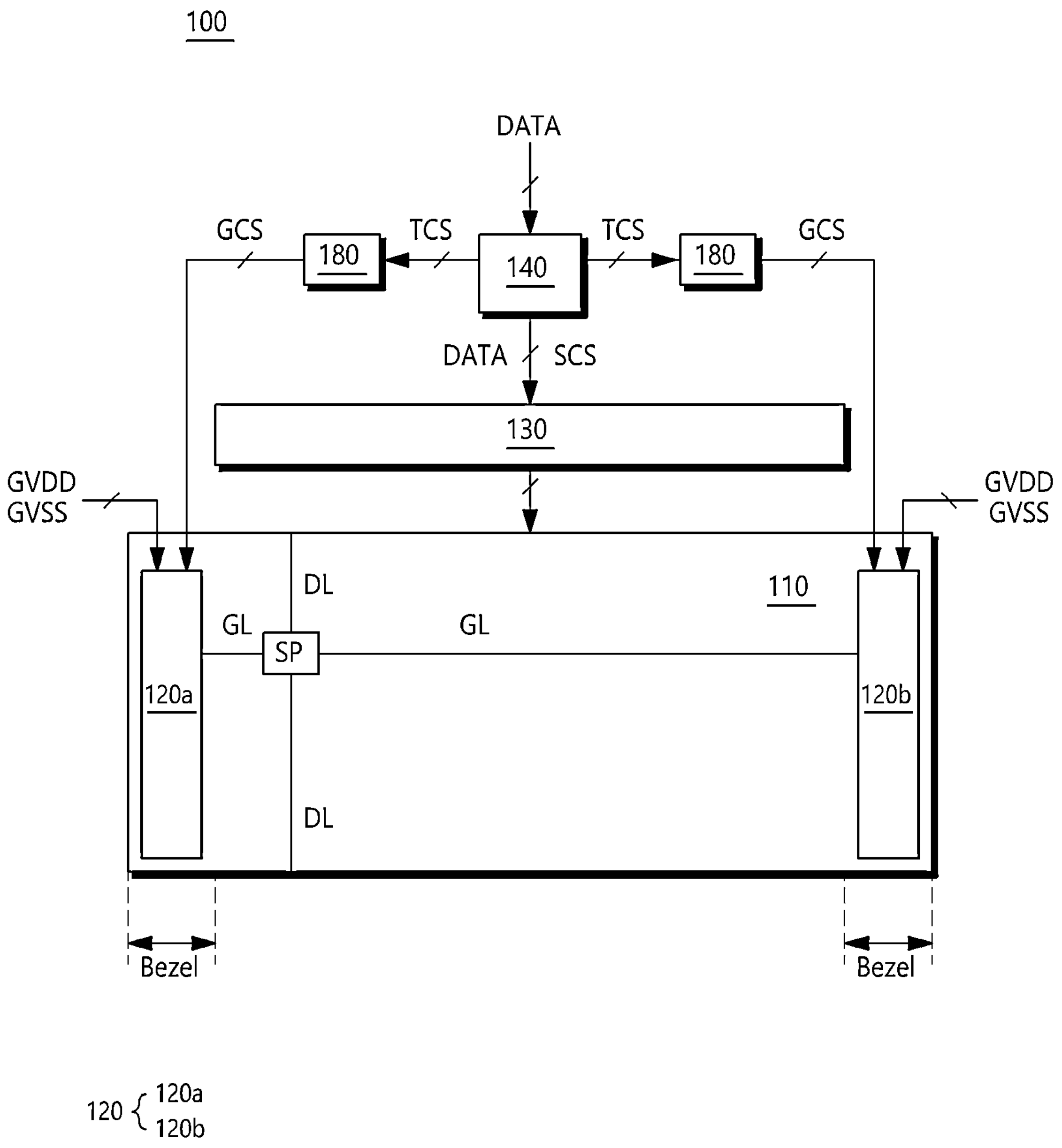
FIG. 2 is a view schematically illustrating a vehicle display device according to embodiments of the disclosure.

FIG. 2 is a view schematically illustrating a vehicle display device according to embodiments of the disclosure.

Referring to FIG. 2, a display device 100 according to embodiments of the disclosure may include a display panel 110, a gate driving circuit 120, a data driving circuit 130, a timing controller 140, and a level shifter 180.

In the display panel 110, a plurality of data lines DL and a plurality of gate lines GL may intersect each other, and subpixels SP may be disposed in a matrix form in each intersection area, forming a subpixel array.

In the case of a liquid crystal display device, the display panel 110 may include a liquid crystal layer formed between two substrates and may be operated in any known mode, such as a twisted nematic (TN) mode, a vertical alignment (VA) mode, an in-plane switching (IPS) mode, or a fringe field switching (FFS) mode. In the case of an organic light emitting display device, the display panel 110 may be implemented in a top emission scheme, a bottom emission scheme, or a dual-emission scheme.

One subpixel SP may include, e.g., a thin film transistor (TFT) disposed in an area formed by one data line DL and one gate line GL, an emission element that emits light according to a data voltage, and a storage capacitor electrically connected to the emission element to maintain the voltage. The thin film transistor may include a driving transistor and one or more switching transistors, and may be implemented as a P-type transistor or an N-type transistor. Alternatively, it may be implemented in a hybrid form in which a P-type transistor and an N-type transistor are mixed.

For example, when the display device 100 having a resolution of 2,160×3,840 includes four subpixels SP of white (W), red (R), green (G), and blue (B), 3,840 data lines DL may be connected to 2,160 gate lines GL and four subpixels WRGB, and thus, there may be provided 3,840×4=15,360 data lines DL. Each subpixel SP is disposed in the area formed by the gate line GL and the data line DL.

The timing controller 140 receives image data DATA from an external host system (not shown) through various interface schemes. The timing controller 140 may correct the image data DATA to compensate for the driving deviation of the subpixel SP based on the sensing result of the characteristic value (e.g., the threshold voltage or mobility of the driving transistor) of the subpixel and then transmit it to the data driving circuit 130.

The timing controller 140 may receive timing signals, such as a vertical synchronization signal, a horizontal synchronization signal, and a data enable signal from the host system. The timing controller 140 generates a source control signal SCS for controlling the operation timing of the data driving circuit 130 and a timing control signal TCS for controlling the operation timing of the gate driving circuit 120 based on the timing signal input from the host system.

The source control signal SCS includes a source sampling clock, a source output enable signal, and the like. The source sampling clock is a clock for controlling the sampling timing of the image data DATA in the data driving circuit 130 based on the rising or falling edge. The source output enable signal is a signal for controlling an output timing for an analog data voltage applied to the display panel 110.

The data driving circuit 130 may include a plurality of source driving integrated chips SDIC. The data driving circuit 130 receives the image data DATA from the timing controller 140. The data driving circuit 130 generates a data voltage by converting the image data DATA into a gamma compensation voltage in response to the source control signal SCS transferred from the timing controller 140, and synchronizes the data voltage with the scan signal of the gate driving circuit 120 and supplies the same to the data lines DL of the display panel 110.

The data driving circuit 130 may be connected to the data line DL of the display panel 110 through a chip on glass (COG) process or a tape automated bonding (TAB) process.

The display device 100 may include a level shifter 180 that generates the gate control signal GCS using the timing control signal TCS output from the timing controller 140 and supplies the generated gate control signal GCS to the gate driving circuit 120. The level shifter 180 may be positioned inside the gate driving circuit 120 or may be positioned on the source printed circuit board on which the data driving circuit 130 is disposed.

The level shifter 180 may convert a transistor-transistor-logic (TTL) level voltage of the timing control signal (TCS) input from the timing controller 140 into a voltage of a turn-on level and a voltage of a turn-off level capable of switching the transistor formed on the display panel 110. Then, the level shifter 180 supplies the gate control signal GCS to the gate driving circuit 120.

The timing control signal TCS may include an on clock, an off clock, an alternating control pulse, and the like.

The gate control signal GCS may include a gate start signal, a gate clock, an even-numbered alternating current (AC) voltage, an odd-numbered AC voltage, a line selection signal, a reset signal, and a panel on signal. The gate clock may be composed of N (where N is a natural number) phase clocks having different phases. When the gate driving circuit 120 includes a scan driving circuit and an emission driving circuit, the gate start signal may include a scan start signal and an emission start signal, and the gate clock may include a scan clock and an emission clock.

For example, in a display device 100 having a resolution of 2,160×3,840, for 2, 160 gate lines GL, when gate signals are sequentially output from the first gate line to the 2,160th gate line may be referred to as 2,160-phase driving. Or, when gate signals are sequentially output on a per-four gate line GL basis, like when gate signals are sequentially output from the first gate line to the fourth gate line and then gate signals are sequentially output from the fifth gate line to the eight gate line, is referred to as four-phase driving. In other words, when gate signals are sequentially output every N gate lines GL may be referred to as N-phase driving.

When the gate driving circuit 120 includes a scan driving circuit and an emission driving circuit, the gate signal may include a scan signal and an emission signal.

Further, the gate driving circuit 120 may include one or more gate driving integrated circuits GDIC.

Based on the gate control signal GCS input from the level shifter 180 and the one or more power supply voltages GVDD and GVSS input from the power management circuit (not shown), the gate driving circuit 120 may output the display gate signal during the display driving period and output the sensing gate signal for sensing the characteristic value of the subpixel SP during the blank period.

The gate driving circuit 120 may be directly formed on the substrate of the display panel 110 in a gate in panel (GIP) manner.

The gate driving circuit 120 may be formed in a bezel area in which an image is not displayed on the display panel 110, but is not limited thereto. The gate driving circuit 120 may be formed in a double bank structure in which the first gate driving circuit 120*a* is disposed in the first bezel area of the display panel 110 and the second gate driving circuit 120*b* is disposed in the second bezel area of the display panel 110 to minimize or at least reduce distortion of the gate signal due to signal delay.

The timing controller 140 may control the display driving operation and the sensing driving operation for the subpixel lines of the display panel 110 based on the source control signal SCS and the timing control signal TCS, thereby sensing the characteristic values for the subpixels SP in real time even in the period in which the image is displayed.

Here, the subpixel line refers to a collection of subpixels SP in the amount of one line, adjacent to each other in the horizontal direction.

The sensing driving operation refers to an operation of sensing the characteristic value of the corresponding subpixel SP by applying sensing data to subpixels SP disposed in a specific subpixel line, and updating the compensation value for compensating for a change in the characteristic value of the corresponding subpixel SP based on the sensing result.

The display device 100 may include a power management circuit that supplies various voltages or currents to the display panel 110, the gate driving circuit 120, the data driving circuit 130, or the like, or controls various voltages or currents to be supplied.

The power management circuit generates power necessary for driving the display panel 100, the gate driving circuit 120, and the data driving circuit 130 by adjusting the direct current (DC) voltage supplied from the external host system.

The display device 100 may be one of various types of devices, such as liquid crystal displays, organic light emitting diode displays, or plasma display panels.

Figure 3:
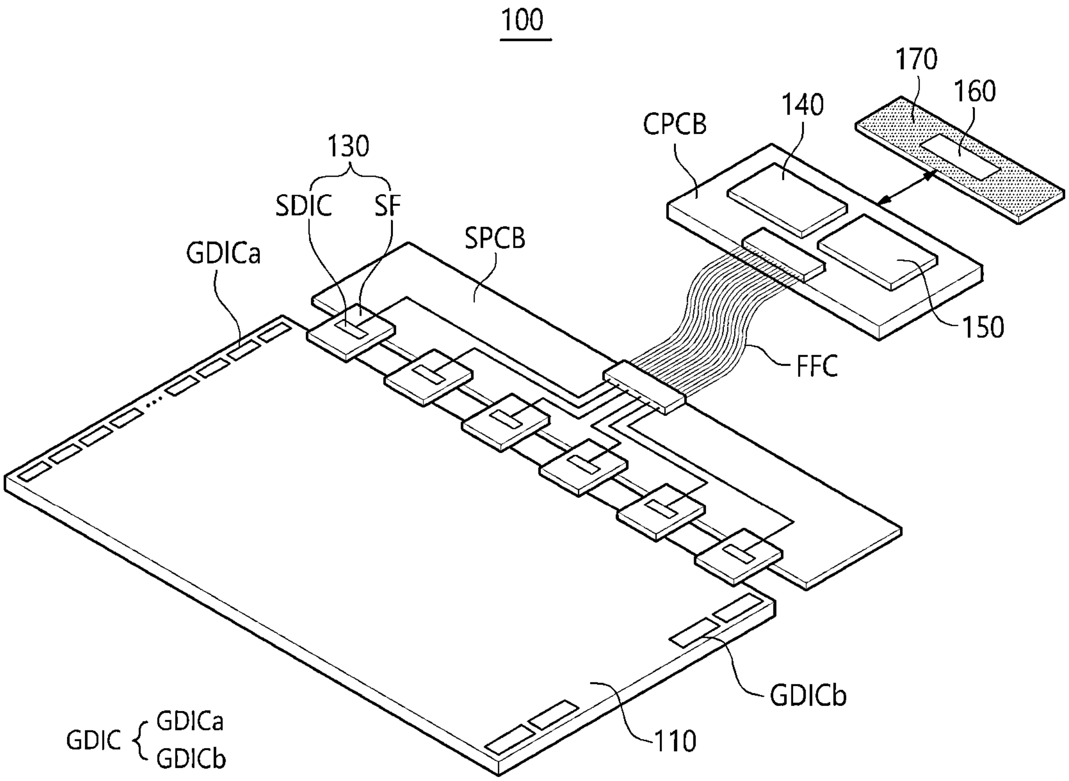
FIG. 3 is a system example view illustrating a display device according to embodiments of the disclosure.

FIG. 3 is a system example view illustrating a display device according to embodiments of the disclosure.

FIG. 3 illustrates an example in which in the display device 100 according to embodiments of the disclosure, the data driving circuit 130 is implemented by a chip on film (COF) type among various types (e.g., TAB, COG, and COF), and the gate driving circuit 120 is implemented by a gate in panel (GIP) type among various types (e.g., TAB, COG, COF, and GIP).

When the gate driving circuit 120 is implemented in the GIP type, the plurality of gate driving integrated circuits GDICa and GDICb included in the gate driving circuit 120 may be directly formed in the bezel area of the display panel 110. In this case, the gate driving integrated circuits GDICa and GDICb may receive various signals (e.g., a gate clock, a gate high signal, a gate low signal, etc.) necessary for generating gate signals through gate driving-related signal lines disposed in the bezel area.

Likewise, one or more source driving integrated circuits SDIC included in the data driving circuit 130 may be mounted on the source film SF, and one side of the source film SF may be electrically connected to the display panel 110. Signal lines for electrically connecting the source driver integrated circuit SDIC and the display panel 110 may be disposed on the source film SF.

The display device 100 may include at least one source printed circuit board SPCB for circuit connection between a plurality of source driving integrated circuits SDIC and other devices and a control printed circuit board CPCB for mounting control components and various electric devices.

The other side of the source film SF where the source driving integrated circuit SDIC is mounted may be connected to at least one source printed circuit board SPCB. In other words, one side of the source film SF where the source driving integrated circuit SDIC is mounted may be electrically connected with the display panel 110, and the other side thereof may be electrically connected with the source printed circuit board SPCB.

The timing controller 140 and the power management circuit 150 may be mounted on the control printed circuit board CPCB. The timing controller 140 may control the operation of the data driving circuit 130 and the gate driving circuit 120. The power management circuit 150 may supply driving voltage or current to the display panel 110, the data driving circuit 130, and the gate driving circuit 120 and control the supplied voltage or current.

At least one source printed circuit board SPCB and control printed circuit board CPCB may be circuit-connected through at least one connection member. The connection member may include, e.g., a flexible printed circuit FPC or a flexible flat cable FFC. The at least one source printed circuit board SPCB and control printed circuit board CPCB may be integrated into a single printed circuit board.

The display device 100 may further include a set board 170 electrically connected to the control printed circuit board CPCB. In this case, the set board 170 may also be referred to as a power board. A main power management circuit 160 for managing the overall power of the display device 100 may be present on the set board 170. The main power management circuit 160 may interwork with the power management circuit 150.

In the so-configured display device 100, the driving voltage is generated in the set board 170 and transferred to the power management circuit 150 in the control printed circuit board CPCB. The power management circuit 150 transfers a driving voltage necessary for display driving or characteristic value sensing to the source printed circuit board SPCB through the flexible printed circuit FPC or flexible flat cable FFC. The driving voltage transferred to the source printed circuit board SPCB is supplied to emit light or sense a specific subpixel SP in the display panel 110 through the source driving integrated circuit SDIC.

Each of the subpixels SP arranged in the display panel 110 in the display device 100 may include an emission element, e.g., an organic light emitting diode, and a circuit element, e.g., a driving transistor, for driving the emission element.

The type and number of circuit elements constituting each subpixel SP may vary depending on functions to be provided and design schemes.

The gate driving circuit 120 may be formed of a scan driving circuit that outputs scan signals or may include a scan driving circuit that outputs scan signals and an emission driving circuit that outputs emission signals, depending on the configuration of the subpixel SP.

Figure 4:
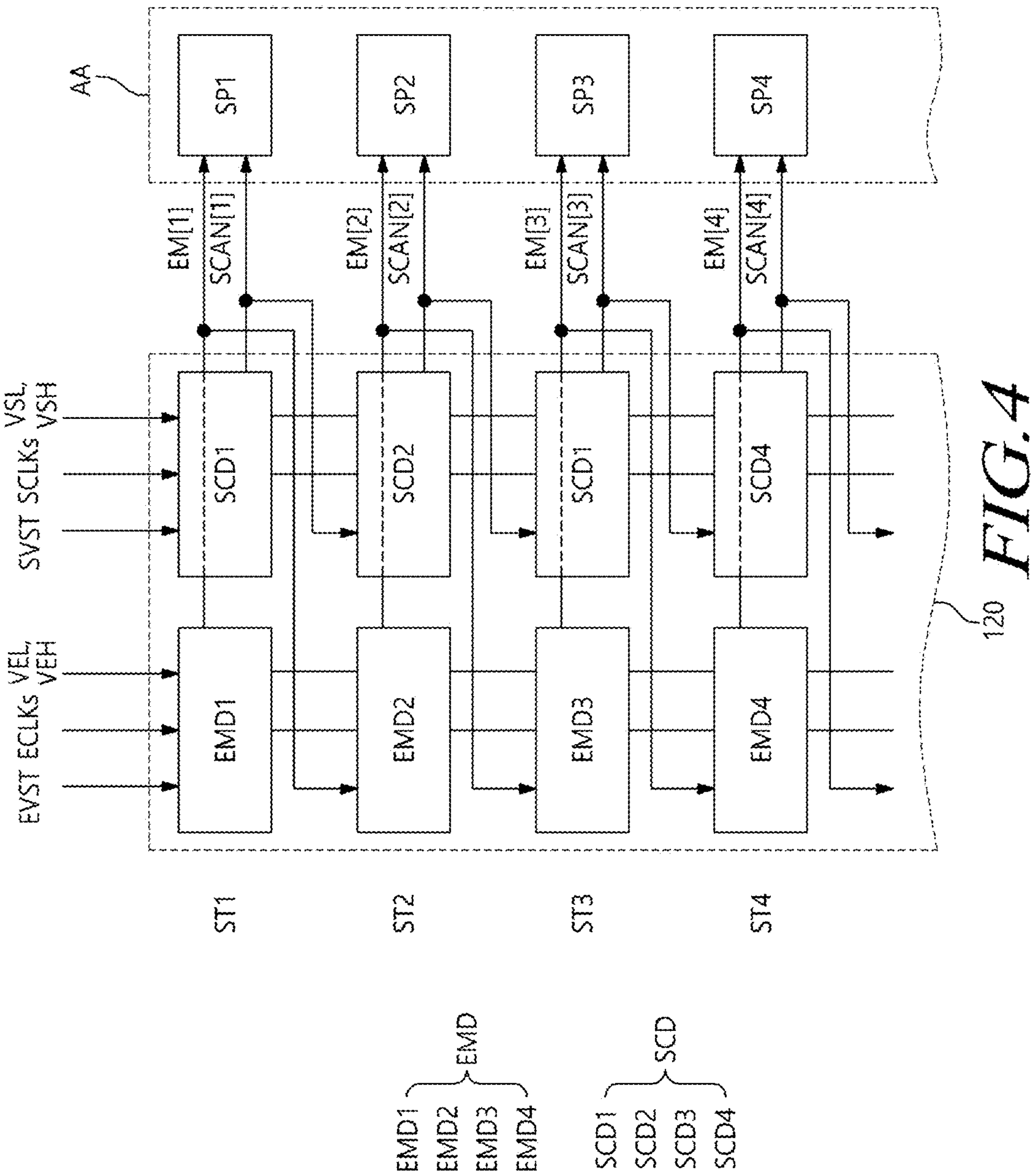
FIG. 4 is a block diagram illustrating an example gate driving circuit including a scan driving circuit and an emission driving circuit in a display device according to embodiments of the disclosure.

FIG. 4 is a block diagram illustrating an example gate driving circuit including a scan driving circuit and an emission driving circuit in a display device according to embodiments of the disclosure.

Referring to FIG. 4, the gate driving circuit 120 of the display device 100 according to embodiments of the disclosure may include a plurality of scan driving circuits SCD1 to SCD4 outputting scan signals SCAN[1] to SCAN[4] used to control the switching transistors included in the plurality of subpixels SP1 to SP4, and a plurality of emission driving circuits EMD1 to EMD4 outputting emission signals used to control the emission control transistors included in the plurality of subpixels SP1 to SP4.

In this case, the scan driving circuit and the emission driving circuit together may be referred to as a gate driving integrated circuit.

When the gate driving circuit 120 is implemented in a gate-in-panel (GIP) type, the scan driving circuit SCD and the emission driving circuit EMD may be disposed as a plurality of stages ST1, ST2, ST3, and ST4 in the bezel area of the display panel 110.

The emission driving circuit EMD may generate the line emission signals EM[1], EM[2], EM[3], and EM[4] by operating based on the emission clocks ECLKs, the emission start signal EVST, the low-potential emission voltage VEL, and the high-potential emission voltage VEH.

In this case, the emission driving circuit EMD1 of the first line may generate the first line emission signal EM[1] using the emission start signal EVST, and the emission driving circuit EMD2 of the second line may generate the second line emission signal EM[2] using the first line emission signal EM[1] output from the emission driving circuit EMD1 of the first line. As described above, from the emission driving circuit EMD2 of the second line, the line emission signal generated by the front-end emission driving circuit may be used as the emission start signal.

The line emission signals EM[1], EM[2], EM[3], and EM[4] may be supplied to the display panel 110 through their respective corresponding subpixel lines, and each of the line emission signals EM[1], EM[2], EM[3], and EM[4] may include one or more emission signals according to the structure of the subpixel SP.

The scan driving circuit SCD may generate the line scan signals SCAN[1], SCAN[2], SCAN[3], and SCAN[4] by operating based on the scan clocks SCLKs, the scan start signal SVST, the low-potential scan voltage VSL, and the high-potential scan voltage VSH.

In this case, the scan driving circuit SCD1 of the first line may generate the first line scan signal SCAN[1] using the scan start signal SVST, and the scan driving circuit SCD2 of the second line may generate the second line scan signal SCAN[2] using the first line scan signal SCAN[1] output from the scan driving circuit SCD1 of the first line. As described above, from the scan driving circuit SCD2 of the second line, the line scan signal generated by the front-end scan driving circuit may be used as the scan start signal.

The line scan signals SCAN[1], SCAN[2], SCAN[3], and SCAN[4] may be supplied to the display panel 110 through their respective corresponding subpixel lines, and each of the line scan signals SCAN[1], SCAN[2], SCAN[3], and SCAN[4] may include one or more scan signals according to the structure of the subpixel SP.

Figure 5:
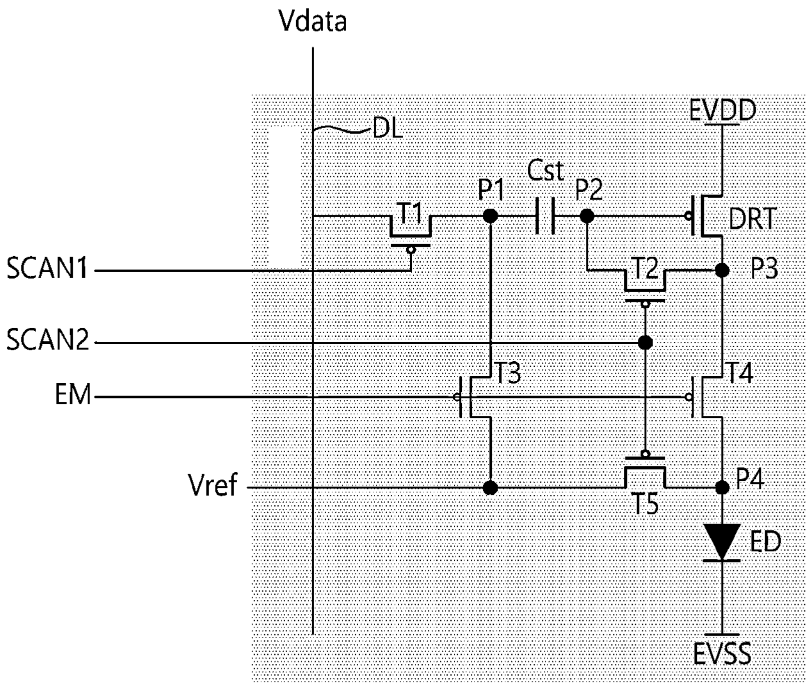
FIG. 5 is a view illustrating an example subpixel circuit in a display device according to embodiments of the disclosure.

FIG. 5 is a view illustrating an example subpixel circuit in a display device according to embodiments of the disclosure.

Referring to FIG. 5, the subpixel circuit of the display device 100 according to embodiments of the disclosure may include an emission element ED, a driving transistor DRT, a plurality of switching transistors T1 to T5, and a storage capacitor Cst.

The driving transistor DRT and the plurality of switching transistors T1 to T5 included in the subpixel circuit may be implemented as PMOS type low temperature poly silicon (LTPS) transistors, thereby securing a desired response characteristic.

Alternatively, at least one of the plurality of switching transistors T1 to T5 may be implemented as an NMOS type or a PMOS type oxide transistor having good leakage current characteristics when turned off, and the remaining switching transistors may be implemented as PMOS type LTPS transistors having good response characteristics.

The emission element ED emits light by a driving current adjusted according to the gate-source voltage Vgs of the driving transistor DRT. The anode electrode of the emission element ED is connected to the fourth node P4, and the cathode electrode of the emission element ED is connected to the low-potential pixel voltage EVSS.

When the emission element ED is an organic emission diode, an organic compound layer is provided between the anode electrode and the cathode electrode.

The organic compound layer may include a hole injection layer HIL, a hole transport layer HTL, an emission layer EML, an electron transport layer ETL, and an electron injection layer EIL. For example, two or more organic compound layers emitting different colors of light may be stacked according to a tandem structure.

When a driving current flows through the emission element ED, holes passing through the hole transport layer HTL and electrons passing through the electron transport layer ETL move to the emission layer EML to form excitons, and as a result, the emission layer EML may emit visible light.

The driving transistor DRT controls a current flowing through the emission element ED according to the gate-source voltage Vgs. The gate electrode of the driving transistor DRT is connected to the second node P2, the drain electrode (or source electrode) is connected to a driving voltage line supplying the high-potential pixel voltage EVDD, and the source electrode (or drain electrode) is connected to the third node P3.

The subpixel circuit may include a first switching transistor T1 to a fifth switching transistor T5 capable of sampling the gate-source voltage Vgs and a storage capacitor Cst to compensate for the threshold voltage or mobility of the driving transistor DRT.

The first switching transistor T1 is connected between the data line DL and the first node P1, and is switched according to the first scan signal SCAN1. The gate electrode of the first switching transistor T1 is connected to the first gate line to which the first scan signal SCAN1 is applied, the drain electrode (or source electrode) is connected to the data line DL, and the source electrode (or drain electrode) is connected to the first node P1.

The second switching transistor T2 is connected between the second node P2 and the third node P3, and is switched according to the second scan signal SCAN2. The gate electrode of the second switching transistor T2 is connected to the second gate line to which the second scan signal SCAN2 is applied, the drain electrode (or source electrode) is connected to the third node P3, and the source electrode (or drain electrode) is connected to the second node P2.

Since one electrode of the second switching transistor T2 is connected to the gate electrode of the driving transistor DRT, it is preferable that the second switching transistor T2 has good Off current characteristics. Accordingly, the second switching transistor T2 may be designed in a dual gate structure to suppress leakage current when turned off.

In the dual gate structure, the first gate electrode and the second gate electrode are connected to each other to have the same potential, and the channel length is longer than that of the single gate structure. As the channel length increases, the resistance increases, and the leakage current decreases when turned off, so that stability of operation may be secured. However, the second switching transistor T2 may be implemented as a single gate structure, and in this case, the second switching transistor T2 may be implemented as an oxide transistor.

The third switching transistor T3 is connected between the first node P1 and the reference voltage line to which the reference voltage Vref is applied, and is switched according to the emission signal EM. The gate electrode of the third switching transistor T3 is connected to the third gate line to which the emission signal EM is applied, the drain electrode (or source electrode) is connected to the first node P1, and the source electrode (or drain electrode) is connected to the reference voltage line.

The fourth switching transistor T4 is connected between the third node P3 and the fourth node P4, which is the anode electrode of the emission element ED, and is switched according to the emission signal EM. The gate electrode of the fourth switching transistor T4 is connected to the third gate line to which the emission signal EM is applied, the drain electrode (or source electrode) is connected to the third node P3, and the source electrode (or drain electrode) is connected to the fourth node P4. Since the fourth switching transistor T4 controls the driving current flowing through the emission element ED, it may be referred to as an emission control transistor.

The fifth switching transistor T5 is connected between the fourth node P4 and the reference voltage line, and is switched according to the second scan signal SCAN2. The gate electrode of the fifth switching transistor T5 is connected to the second gate line to which the second scan signal SCAN2 is applied, the drain electrode (or source electrode) is connected to the fourth node P4, and the source electrode (or drain electrode) is connected to the reference voltage line.

The storage capacitor Cst is connected between the first node P1 and the second node P2.

The display device 100 according to the disclosure may operate the driving circuit and the display panel using power supplied from the host system.

Figure 6:
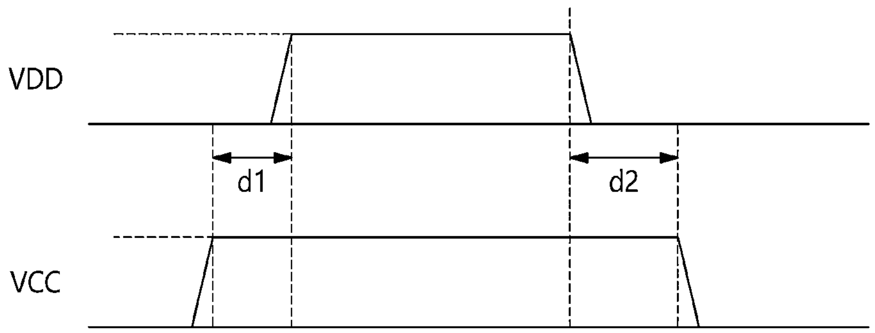
FIG. 6 is a view illustrating an example power waveform of a host system supplied to a display device according to embodiments of the disclosure.

FIG. 6 is a view illustrating an example power waveform of a host system supplied to a display device according to embodiments of the disclosure.

Referring to FIG. 6, the display device 100 according to embodiments of the disclosure may operate driving circuits such as the timing controller 140 and the power management circuit 150 using the first power VCC supplied from the host system, and may drive the display panel 110 using the second power VDD supplied from the host system.

The first power VCC supplied from the host system to operate the driving circuit such as the timing controller 140 and the power management circuit 150 may be referred to as circuit power, and the first power VCC may be 3.3 V. Further, the second power VDD supplied from the host system to drive the display panel 110 may be referred to as panel power, and the second power VDD may be 20V.

In this case, in order for the display device 100 to be normally turned on, it is preferable that the driving circuit is first operated by the first power supply VCC and, after a turn-on delay time d1 elapses, then the display panel 110 is driven by the second power supply VDD.

Further, in order for the display device 100 to be normally turned off, it is preferable that the second power VDD is cut off to turn off the display panel 110 and, after a turn-off delay time d2 elapses, the first power VCC is cut off to turn off the driving circuit.

However, when the first power VCC and the second power VDD applied from the host system are abnormally cut off, a gate signal may be applied before the display panel 110 is turned off, so that a display error may occur.

Figure 7:
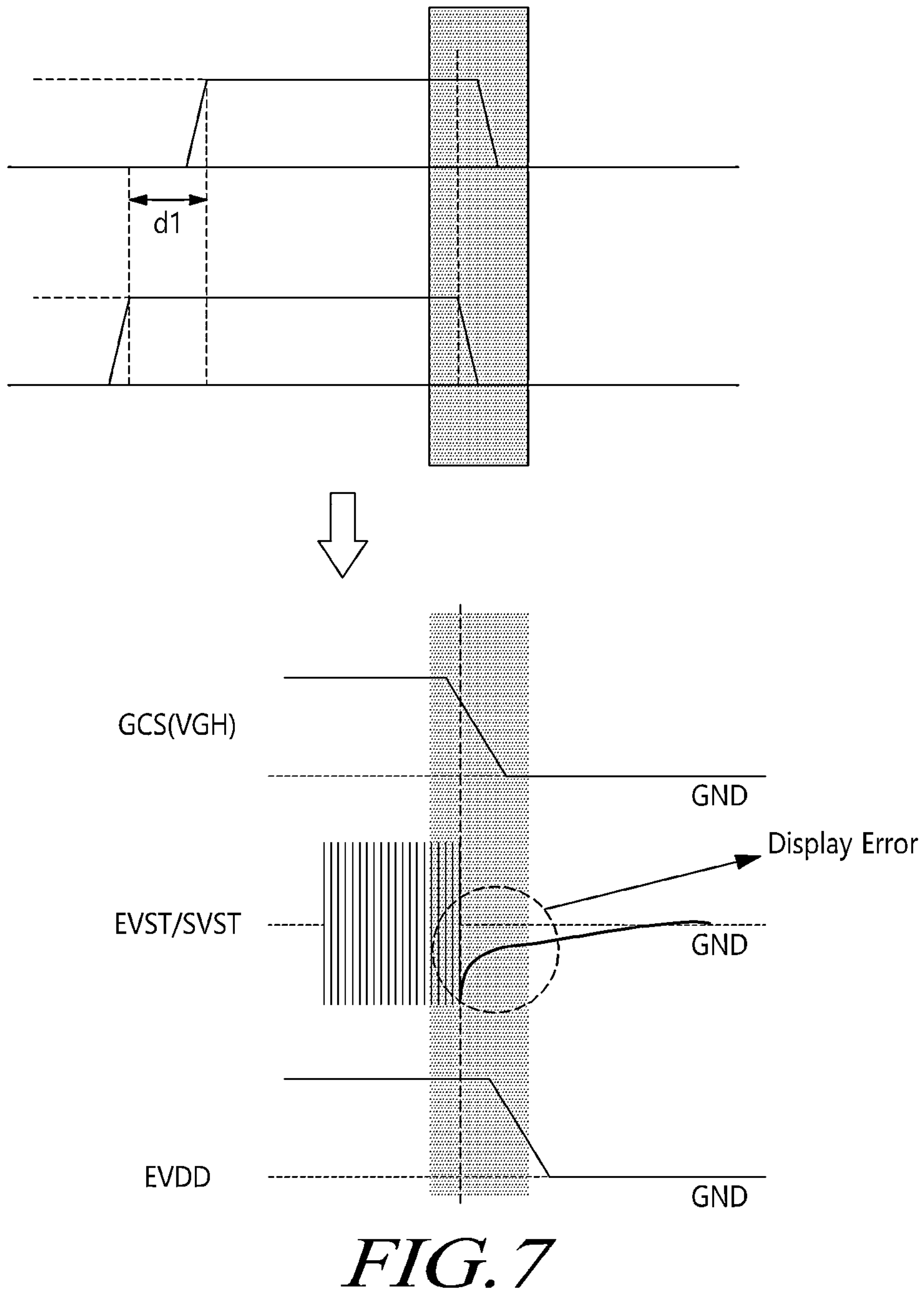
FIG. 7 is a view illustrating an example signal error when power supplied to a host system is abnormally cut off in a display device according to embodiments of the disclosure.

FIG. 7 is a view illustrating an example signal error when power supplied to a host system is abnormally cut off in a display device according to embodiments of the disclosure.

Referring to FIG. 7, in order for the display device 100 according to embodiments of the disclosure to be normally turned off, it is needed that the second power VDD driving the display panel 110 is turned off and, after a predetermined turn-off delay time d2 elapses, the first power VCC operating the driving circuit is turned off.

However, when the host system is abnormally cut off, such as when the battery power is turned off, the first power VCC operating the driving circuit may be cut off in a state in which the second power VDD driving the display panel 110 is turned on.

In this case, while the gate control signal GCS supplied to the gate driving circuit 120 is cut off in the level shifter 180, a display error in which some subpixels SP emit light may occur due to the emission signal EM and the scan signal SCAN applied to the display panel 110.

For example, when the emission control transistor (T4 in FIG. 5) of the subpixel SP is a PMOS transistor, the emission control transistor emits light by the low-level emission signal EM, and thus a display error occurs in which a partial area of the display panel 110 emits light by the low-level emission signal EM applied while the gate control signal GCS is cut off.

When the power of the host system is abnormally cut off, the display device 100 according to the disclosure detects this and cuts off the emission control transistor of the display panel 110, thereby preventing or at least reducing an accident caused by a display error.

Figure 8:
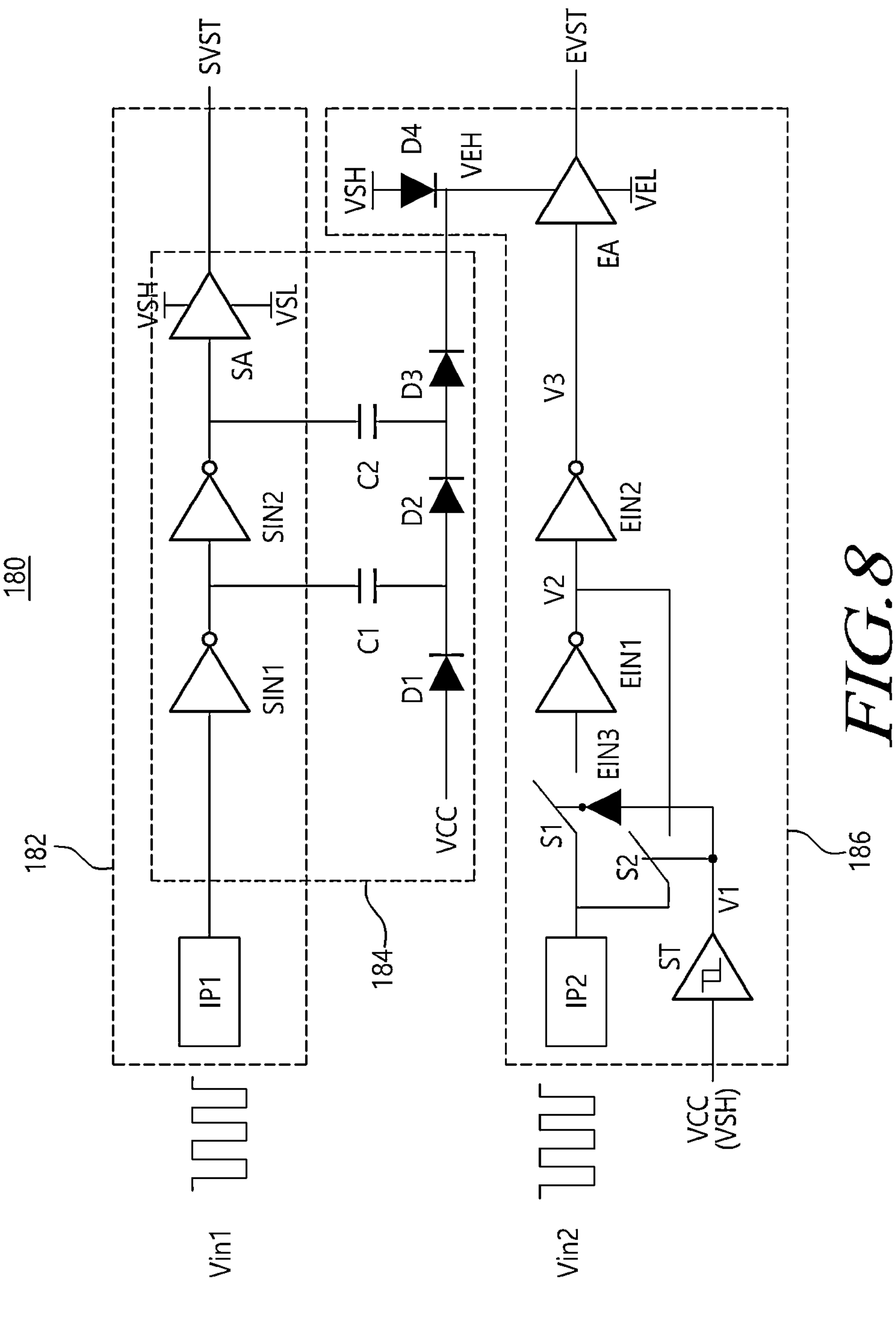
FIG. 8 is a circuit block diagram illustrating a level shifter in a display device according to embodiments of the disclosure.

FIG. 8 is a circuit block diagram illustrating a level shifter in a display device according to embodiments of the disclosure.

Referring to FIG. 8, a level shifter 180 of a display device 100 according to embodiments of the disclosure may include a scan channel circuit 182 generating a scan start signal SVST of a subpixel SP according to a first input signal Vin1, a charge pump circuit 184 generating a high-potential emission voltage VEH using circuit power VCC of a host system, and an emission channel circuit 186 controlling an emission start signal EVST according to a second input signal Vin2 with a change in the circuit power of the host system reflected.

The scan channel circuit 182 may include a first input pad IP1 receiving a first input signal Vin1, one or more scan inverters SIN1 and SIN2 connected in series to the first input pad IP1, and a scan amplifier SA generating a scan start signal SVST using signals of the scan inverters SIN1 and SIN2.

The first input signal Vin1 is a pulse signal for generating the scan start signal SVST, and may be a scan clock GCLK.

The one or more scan inverters SIN1 and SIN2 connected in series to the first input pad IP1 may include an even number or an odd number of inverters. When an even number of scan inverters are connected in series to the first input pad IP1, a scan start signal SVST having the same phase as the first input signal Vin1 may be output, and when an odd number of scan inverters are connected in series to the first input pad IP1, a scan start signal SVST having a phase opposite to the first input signal Vin1 may be output.

The scan amplifier SA may be an operational amplifier that uses a high-potential scan voltage VSH as positive power, uses a low-potential scan voltage VSL as negative power, and outputs a scan start signal SVST to transition between a level of the high-potential scan voltage VSH and a level of the low-potential scan voltage VSL.

The charge pump circuit 184 may include one or more diodes D1, D2, and D3 connected in series to transfer the circuit power VCC of the host system, and one or more capacitors C1 and C2 connecting the output nodes of the scan inverters SIN1 and SIN2 constituting the scan channel circuit 182 and the output nodes of the diodes D1 and D2.

The one or more diodes D1, D2, and D3 connected in series in the charge pump circuit 184 sequentially transfer the circuit power VCC charged through the capacitors C1 and C2. When the two capacitors C1 and C2 are disposed in the charge pump circuit 184, a high-potential emission voltage VEH of 3VCC may be output by the voltage VCC charged to each of the capacitors C1 and C2.

Since the charge pump circuit 184 stores the circuit power VCC using the capacitors C1 and C2, the charge pump circuit 184 may be formed to have a smaller size than when an inductor is used.

The emission channel circuit 186 may include a second input pad IP2 receiving a second input signal Vin2, two switches S1 and S2 connected in parallel to the second input pad IP2, a first emission inverter EIN1 and a second emission inverter EIN2 connected in series to the first switch S1, an oscillation circuit ST converting the circuit power VCC of the host system into a pulse voltage V1, a switch control circuit controlling the two switches S1 and S2 according to the pulse voltage V1, and an emission amplifier EA generating an emission start signal EVST using the signals of the emission inverters EIN1 and EIN2.

The second input signal Vin2 is a pulse signal for generating the emission start signal EVST, and may be an emission clock ECLK. The second input signal Vin2 may be a signal identical to or different from the first input signal Vin1.

One or more emission inverters connected in series to the second input pad IP2 may be formed of an even or odd number of inverters. When an even number of emission inverters are connected in series to the second input pad IP2, an emission start signal EVST having the same phase as the second input signal Vin2 may be output, and when an odd number of emission inverters are connected in series to the second input pad IP2, an emission start signal EVST having a phase opposite to the second input signal Vin2 may be output.

The oscillation circuit ST may be a Schmidt-trigger circuit that outputs the pulse voltage V1 according to the level of the circuit power VCC of the host system. When the level of the circuit power VCC of the host system is lowered below a threshold value, the Schmidt-trigger circuit may generate a pulse voltage V1 of a high level opposite to the level of the circuit power VCC.

Meanwhile, the signal input to the oscillation circuit ST may be the circuit power VCC of the host system or may be a signal interworking with the circuit power VCC. For example, the high-potential scan voltage VSH may be generated using the circuit power VCC of the host system. In this case, since the high-potential scan voltage VSH fluctuates in association with the circuit power VCC of the host system, the high-potential scan voltage VSH may be used as an input signal of the oscillation circuit ST.

The switch control circuit may control the first switch S1 through the third emission inverter EIN3 that transfers the pulse voltage V1 of the oscillation circuit ST, and may control the second switch S2 through the pulse voltage V1 of the oscillation circuit ST. In other words, the first switch S1 and the second switch S2 are controlled so that the open state and the shorted state are opposite to each other.

Accordingly, the emission start signal EVST may be generated by the second input signal Vin2 in the state in which the first switch S1 is shorted, and the level of the emission start signal EVST may be controlled by the pulse voltage V1 of the oscillation circuit ST in the state in which the second switch S2 is shorted.

The emission amplifier EA may be an operational amplifier that outputs the emission start signal EVST to transition between the level of the high-potential emission voltage VEH and the level of the low-potential emission voltage VEL.

The high-potential emission voltage VEH output from the charge pump circuit 184 may be applied to the high-potential node of the emission amplifier EA, and the high-potential scan voltage VSH together may be applied through the fourth diode D4. For this reason, when the high-potential scan voltage VSH is applied at a high level, the emission channel circuit 186 may operate, but even when the high-potential scan voltage VSH is lowered to a low level, the emission channel circuit 186 may be operated by the high-potential emission voltage VEH output from the charge pump circuit 184.

Since the high-potential scan voltage VSH is generated in association with the circuit power VCC of the host system, when the circuit power VCC of the host system is changed to a low level, the high-potential scan voltage VSH may also be changed to a low level. Accordingly, the output voltage VEH of the charge pump circuit 184 may be supplied to the emission amplifier EA of the emission channel circuit 186 together so that the emission channel circuit 186 may operate even if the circuit power VCC of the host system is abnormally cut off.

Figure 9:
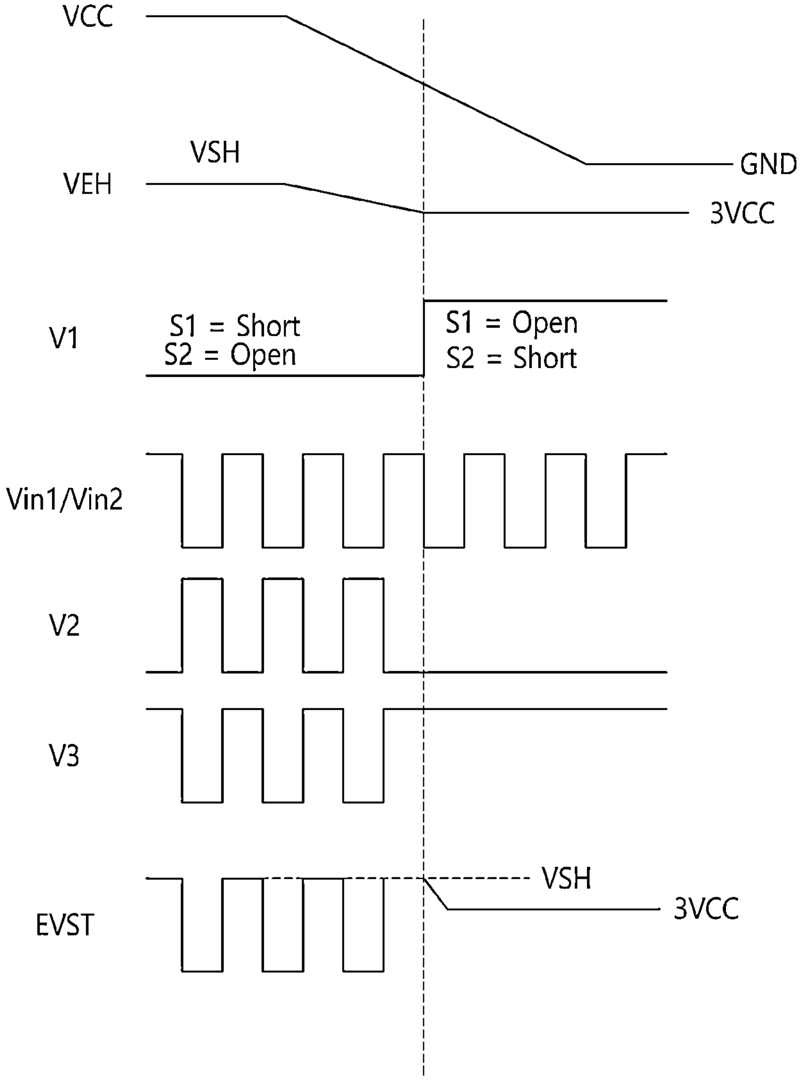
FIGS. 9 and 10 are signal waveform diagrams illustrating operations of a level shifter in a display device according to embodiments of the disclosure.
Figure 10:
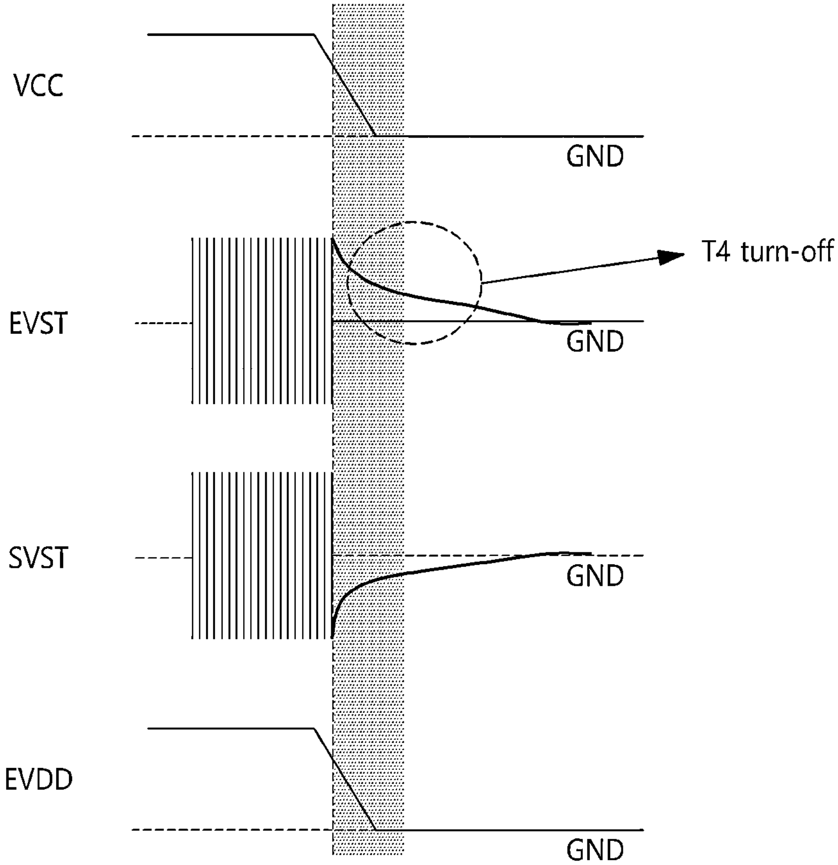

FIGS. 9 and 10 are signal waveform diagrams illustrating operations of a level shifter in a display device according to embodiments of the disclosure. FIG. 11 is a view illustrating an example screen state of a display panel when a display device is abnormally blocked.

Referring to FIGS. 9 and 10, when the display device 100 according to embodiments of the disclosure is normally turned off, the panel power VDD driving the display panel 110 is turned off and, after a predetermined turn-off delay time elapses, the circuit power VCC operating the driving circuit is turned off.

However, when the host system is abnormally cut off, such as when the battery power is turned off, the circuit power VCC operating the driving circuit may be lowered to the ground voltage GND less than or equal to the threshold value in a state in which the high-potential pixel voltage EVDD driving the display panel 110 is turned on.

As described above, when the circuit power VCC supplied from the host system is abnormally lowered, the high-potential scan voltage VSH interworking with the circuit power VCC may also be lowered. In this case, the scan start signal SVST output through the scan channel circuit 182 may also be lowered to the low level by the high-potential scan voltage VSH of the low level. As a result, the PMOS type switching transistors (e.g., T1 and T2 of FIG. 5) of the subpixel receiving the scan start signal SVST may be turned on.

However, since the level shifter 180 of the disclosure maintains the high-potential emission voltage VEH at a high level (e.g., 3VCC) through the charge pump circuit 184, the emission start signal EVST output through the emission channel circuit 186 is maintained at a high level. As a result, the PMOS-type emission control transistor (e.g., T4 of FIG. 5) of the subpixel receiving the emission start signal EVST may be turned off to prevent or at least reduce display errors.

In other words, when the display device 100 according to the disclosure operates normally, the emission channel circuit 186 of the level shift 180 may output the emission start signal EVST according to the second input signal Vin2 corresponding to the emission clock ECLK, but when the display device 100 is abnormally cut off and the circuit power VCC is turned off before the panel power VDD, the emission start signal EVST may be output at the turn-off level by generating a pulse voltage V1 opposite to the level of the circuit power VCC through the oscillation circuit ST.

Figure 11A:
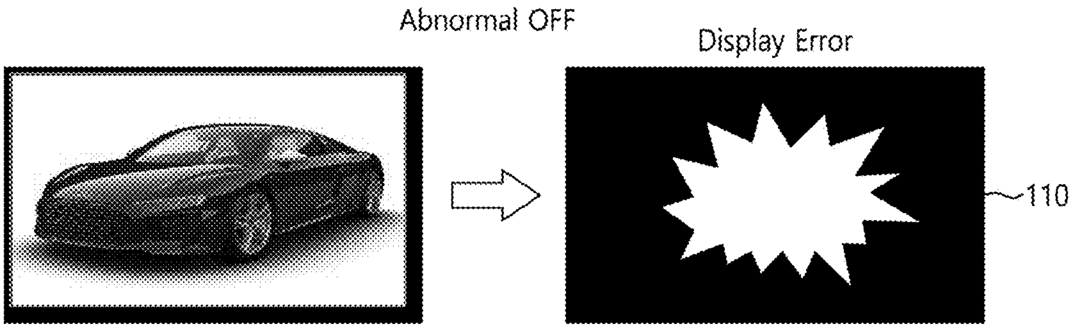
FIGS. 11A and 11B illustrate example screen states of a display panel with or without display error when a vehicle display device is abnormally blocked.
Figure 11B:
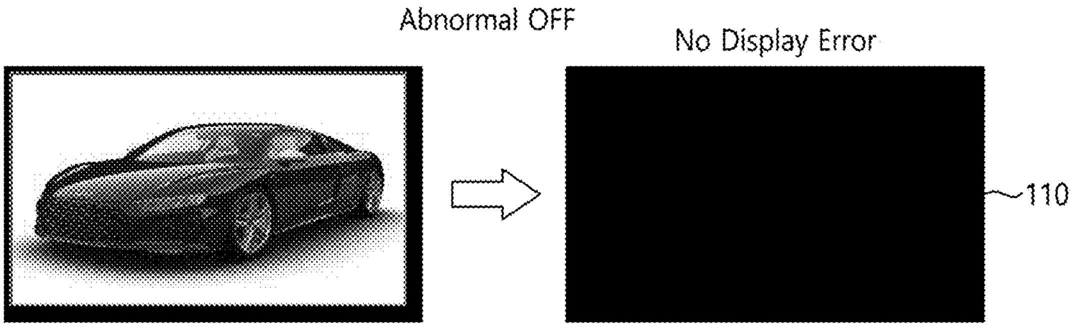

As a result, while the conventional vehicle display device 100 may experience a display error on the display panel 110 as shown in FIG. 11A when abnormally cut off, the display device 100 according to the disclosure may prevent or at least reduce a display error on the display panel 110 and an accident by turning off the emission control transistor (T4 of FIG. 5) as shown in FIG. 11B although the circuit power VCC is abnormally cut off.

Embodiments of the disclosure described above are briefly described below.

A display device of the disclosure may comprise a display panel including a plurality of subpixels, a gate driving circuit supplying a scan signal and an emission signal to the display panel through a plurality of gate lines, a level shifter controlling the gate driving circuit, and a timing controller controlling the level shifter. The level shifter may include a scan channel circuit generating a scan start signal for the plurality of subpixels according to a first input signal, a charge pump circuit generating a high-potential emission voltage using circuit power of a host system, and an emission channel circuit controlling an emission start signal according to a second input signal with a change in the circuit power reflected.

The subpixel may include an emission element, a driving transistor controlling a current flowing to the emission element according to a gate-source voltage, a first switching transistor connected between a data line and a first node and switched according to a first scan signal, a second switching transistor connected between a second node and a third node and switched according to a second scan signal, a third switching transistor connected between the first node and a reference voltage line and switched according to the emission signal, a fourth switching transistor connected between the third node and an anode electrode of the emission element and switched according to the emission start signal, a fifth switching transistor connected between the anode electrode and the reference voltage line and switched according to the second scan signal, and a storage capacitor connected between the first node and the second node.

The driving transistor may be a PMOS-type low temperature poly silicon (LTPS) transistor.

The emission element may be an organic emission diode.

At least one of the first switching transistor to the fifth switching transistor may be a PMOS-type oxide transistor.

The gate driving circuit may include a first scan driving circuit generating a first line scan signal using the scan start signal, one or more rear-end scan driving circuits generating a rear-end line scan signal using a line scan signal output from a front-end scan driving circuit, a first emission driving circuit generating a first emission signal using the emission start signal, and one or more rear-end emission driving circuits generating a rear-end emission signal using an emission signal output from a front-end emission driving circuit.

The scan channel circuit may include a first input pad receiving the first input signal, one or more scan inverters connected in series to the first input pad, and a scan amplifier generating the scan start signal using an output signal of the one or more scan inverters.

The first input signal may be a scan clock.

The scan amplifier may use a high-potential scan voltage generated using the circuit power, as positive power.

The charge pump circuit may include one or more diodes connected in series to transfer the circuit power and one or more capacitors connecting an output node of a scan inverter constituting the scan channel circuit and an output node of the diode.

The emission channel circuit may include a second input pad receiving a second input signal, a first switch and a second switch connected in parallel to the second input pad, a first emission inverter and a second emission inverter connected in series to the first switch, an oscillation circuit converting the circuit power or a high-potential scan voltage generated using the circuit power into a pulse voltage, a switch control circuit controlling the first switch and the second switch according to the pulse voltage, and an emission amplifier generating the emission start signal using a signal of the second emission inverter.

The second input signal may be an emission clock.

The oscillation circuit may be a Schmitt-trigger circuit.

When the level of the circuit power is lowered below a threshold value, the oscillation circuit may generate a pulse voltage of a high level opposite to the level of the circuit power.

The first switch and the second switch may perform operations opposite to each other by a third emission inverter.

The emission amplifier may receive the high-potential emission voltage as positive power, and receive the high-potential scan voltage as positive power through a diode.

A level shifter of the disclosure may comprise a scan channel circuit generating a scan start signal for a plurality of subpixels according to a first input signal, a charge pump circuit generating a high-potential emission voltage using circuit power of a host system, and an emission channel circuit controlling an emission start signal according to a second input signal with a change in the circuit power reflected.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

What is claimed:

1. A display device, comprising:

a display panel including a plurality of subpixels;

a gate driving circuit configured to supply a scan signal and an emission signal to the display panel through a plurality of gate lines;

a level shifter configured to control the gate driving circuit; and a timing controller configured to control the level shifter, wherein the level shifter includes:

a scan channel circuit configured to generate a scan start signal for the plurality of subpixels according to a first input signal;

a charge pump circuit configured to generate a high-potential emission voltage using circuit power of a host system; and an emission channel circuit configured to control an emission start signal according to a second input signal with a change in the circuit power reflected.

2. The display device of claim 1, wherein a subpixel among the plurality of subpixels includes:

an emission element;

a driving transistor controlling a current flowing to the emission element according to a gate-source voltage;

a first switching transistor connected between a data line and a first node, the first switching transistor switched according to a first scan signal;

a second switching transistor connected between a second node and a third node, the second switching transistor switched according to a second scan signal;

a third switching transistor connected between the first node and a reference voltage line, the third switching transistor switched according to the emission signal;

a fourth switching transistor connected between the third node and an anode electrode of the emission element, the fourth switching transistor switched according to the emission start signal;

a fifth switching transistor connected between the anode electrode and the reference voltage line, the fifth switching transistor switched according to the second scan signal; and a storage capacitor connected between the first node and the second node.

3. The display device of claim 2, wherein the driving transistor is a PMOS-type low temperature poly silicon (LTPS) transistor.

4. The display device of claim 2, wherein at least one of the first switching transistor, the second switching transistor, the third switching transistor, the fourth switching transistor, or the fifth switching transistor is a PMOS-type oxide transistor.

5. The display device of claim 2, wherein the emission element is an organic emission diode.

6. The display device of claim 1, wherein the gate driving circuit includes:

a first scan driving circuit configured to generate a first line scan signal using the scan start signal;

one or more rear-end scan driving circuits configured to generate a rear-end line scan signal using a line scan signal output from a front-end scan driving circuit;

a first emission driving circuit configured to generate a first emission signal using the emission start signal; and one or more rear-end emission driving circuits configured to generate a rear-end emission signal using an emission signal output from a front-end emission driving circuit.

7. The display device of claim 1, wherein the scan channel circuit includes:

a first input pad receiving the first input signal;

one or more scan inverters connected in series to the first input pad; and a scan amplifier configured to generate the scan start signal using an output signal of the one or more scan inverters.

8. The display device of claim 7, wherein the first input signal is a scan clock.

9. The display device of claim 7, wherein the scan amplifier uses a high-potential scan voltage generated using the circuit power, as positive power.

10. The display device of claim 1, wherein the charge pump circuit includes:

one or more diodes connected in series to transfer the circuit power; and one or more capacitors connecting an output node of a scan inverter and an output node of the one or more diodes, the scan inverter constituting the scan channel circuit.

11. The display device of claim 1, wherein the emission channel circuit includes:

a second input pad receiving a second input signal;

a first switch and a second switch connected in parallel to the second input pad;

a first emission inverter and a second emission inverter connected in series to the first switch;

an oscillation circuit configured to convert the circuit power or a high-potential scan voltage generated using the circuit power into a pulse voltage;

a switch control circuit configured to control the first switch and the second switch according to the pulse voltage; and an emission amplifier configured to generate the emission start signal using a signal of the second emission inverter.

12. The display device of claim 11, wherein the second input signal is an emission clock.

13. The display device of claim 11, wherein the oscillation circuit is a Schmitt-trigger circuit.

14. The display device of claim 13, wherein when a level of the circuit power is lowered below a threshold value, the oscillation circuit generates a pulse voltage of a high level opposite to a level of the circuit power.

15. The display device of claim 11, wherein the first switch and the second switch perform operations opposite to each other by a third emission inverter.

16. The display device of claim 11, wherein the emission amplifier receives the high-potential emission voltage as positive power, and receives the high-potential scan voltage as positive power through a diode.

17. A level shifter, comprising:

a scan channel circuit configured to generate a scan start signal for a plurality of subpixels according to a first input signal;

a charge pump circuit configured to generate a high-potential emission voltage using circuit power of a host system; and an emission channel circuit configured to control an emission start signal according to a second input signal with a change in the circuit power reflected.

18. The level shifter of claim 17, wherein the scan channel circuit includes:

a first input pad receiving the first input signal;

one or more scan inverters connected in series to the first input pad; and a scan amplifier configured to generate the scan start signal using an output signal of the one or more scan inverters.

19. The level shifter of claim 17, wherein the charge pump circuit includes:

one or more diodes connected in series to transfer the circuit power; and one or more capacitors connecting an output node of a scan inverter and an output node of the one or more diodes, the scan inverter constituting the scan channel circuit.

20. The level shifter of claim 17, wherein the emission channel circuit includes:

a second input pad receiving a second input signal;

a first switch and a second switch connected in parallel to the second input pad;

a first emission inverter and a second emission inverter connected in series to the first switch;

an oscillation circuit configured to convert the circuit power or a high-potential scan voltage generated using the circuit power into a pulse voltage;

a switch control circuit configured to control the first switch and the second switch according to the pulse voltage; and an emission amplifier configured to generate the emission start signal using a signal of the second emission inverter.

* * * * *